United States Patent
Birkedahl

(10) Patent No.: US 8,953,438 B2
(45) Date of Patent: Feb. 10, 2015

(54) MULTIPLE SOURCE VIRTUAL LINK REVERSION IN SAFETY CRITICAL SWITCHED NETWORKS

(75) Inventor: Byron Birkedahl, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1062 days.

(21) Appl. No.: 12/847,636

(22) Filed: Jul. 30, 2010

(65) Prior Publication Data

US 2012/0027022 A1    Feb. 2, 2012

(51) Int. Cl.
  H04L 1/00        (2006.01)
  H04L 12/939      (2013.01)
  H04L 12/24       (2006.01)
  H04L 12/46       (2006.01)
  H04L 12/931      (2013.01)

(52) U.S. Cl.
  CPC ........... *H04L 12/4641* (2013.01); *H04L 49/351* (2013.01); *H04L 49/552* (2013.01); *H04L 41/0668* (2013.01)
  USPC ............ 370/219; 370/244; 370/389; 709/239

(58) Field of Classification Search
  None
  See application file for complete search history.

(56) References Cited

U.S. PATENT DOCUMENTS

| | | | | |
|---|---|---|---|---|
| 5,991,308 A * | 11/1999 | Fuhrmann et al. | ....... | 370/395.53 |
| 6,560,630 B1 | 5/2003 | Vepa et al. | | |
| 2008/0031263 A1* | 2/2008 | Ervin et al. | .................... | 370/397 |
| 2008/0043768 A1* | 2/2008 | Lopez et al. | .................. | 370/412 |
| 2010/0183016 A1* | 7/2010 | Bonk et al. | .................... | 370/400 |

OTHER PUBLICATIONS

Determan, S. and C. Arthmann, "Carrier Class Availability for Enterprises", "Alcatel Telecommunications Review Technology White Paper", Jan. 2003, Publisher: Alcatel.
"Application Traffic Management: Resilient Load Balancing", "available at http://www.zeus.com/products/load-balancer/traffic_management.html", accessed Apr. 29, 2010, Publisher: Zeus.

* cited by examiner

*Primary Examiner* — Khoa Huynh
(74) *Attorney, Agent, or Firm* — Fogg & Powers LLC

(57) ABSTRACT

In a system that uses a switched network and virtual links (for example, an AFDX, TT-ETHERNET, or TT-Gigabit ETHERNET switched ETHERNET network), the system is configured so that, for at least one virtual link, the end system that sources frames for that virtual link can change (for example, when an end system that was previously sourcing frames for that virtual link fails). The switches used in such a system are configured to be able to accept frames if there is such a change.

13 Claims, 14 Drawing Sheets

MULTIPLE SOURCE VIRTUAL LINK REVERSION IN SAFETY CRITICAL SWITCHED NETWORKS

BACKGROUND

Typical networks implemented using conventional, unextended ETHERNET technology exhibit non-deterministic behavior that may not be suitable for some applications (for example, safety-critical applications). As used herein, "ETHERNET" refers to technology described in the Institute of Electrical and Electronics Engineers (IEEE) 802.3 family of standards and specifications.

One data network architecture that is used to emulate a deterministic, point-to-point network using ETHERNET technology employs a switched ETHERNET network and "virtual links". A common implementation of this type of network is an Avionics Full-Duplex Switched Ethernet (AFDX) network. Other implementations include a Time-Triggered-ETHERNET (TT-E) network or Time-Triggered-Gigabit ETHERNET (TT-GbE) network.

A typical topology for a safety-critical switched network 100 that uses virtual links is shown in FIGS. 1A-1C. This network 100 enables communication between software applications 102 via redundantly connected switches 106. The switched network 100 is configured to implement one or more logical communication channels for communications among the end systems 102. In the particular example shown in FIGS. 1A-1C, two communications channels are used, which are individually referred to here as channels "A" and "B" (though it is to be understood that the network 100 can be configured a different number of communication channels). Each communication channel is implemented using a separate set of switches 106 and full-duplex physical communication links, where the set of switches 106 to implement channel A are identified in FIGS. 1A-1C with the label "106-A" and the set of switches 106 used to implement channel B are identified in FIGS. 1A-1C with the label "106-B". The redundancy of switches 106 enables data communications to continue even if there are failures of the switches 106.

The software applications 102 are hosted on network-connected end systems 104, which are individually labeled in FIGS. 1A-1C as "end system 104-1", "end system 104-2", through "end system 104-9".

As noted above, networks of this type utilize the virtual link concept for safety-critical communications. A virtual link is a pre-configured uni-directional data path from one source to one or more destinations. Also, each virtual link has an associated virtual link identifier (ID) number that is included in each frame that is communicated via that virtual link.

Two exemplary virtual links are shown in FIG. 1B that are sourced by different applications that are hosted on the same end system 104. In the example shown in FIG. 1B, a first virtual link 108 is used to communicate frames that are sourced by application 102-4. Frames sourced by application 102-4 are communicated over the network 100 to three different applications 102—application 102-9, application 102-11, and application 102-16. In the example shown in FIG. 1B, a second virtual link 110 is sourced by application 102-3. Frames sourced by application 102-3 are communicated over the network 100 to a single application 102—application 102-13.

The network 100 is configured with each end system 104 coupled to one switch 106-A that is used to implement channel A and to one switch 106-B used to implement channel B. The network 100 is configured so that frames for each virtual link are to be received at each switch 106 on a particular switch port. Each switch port of each switch 106 checks each frame that is received on that switch port in order to confirm that the virtual link ID of the frame corresponds to a virtual link that is supposed to be received on that switch port. Each switch port also typically performs traffic policing for the frames it receives (for example, each switch port checks frame size and timing).

Typically, in a network 100 of the type shown in FIGS. 1A-1C, each application 102 is hosted on a single end system 104. As a result, if an end system 104 fails, all the applications 102 that are hosted on that end system 104 are not able to source data and all the destination applications 102 that normally receive data from those source applications 102 will not receive such data. For example, as shown in FIG. 1C, if the end system 104-2 that hosts applications 102-3 and 102-4 fails, applications 102-3 and 102-4 will not be able to source data for the first and second virtual links 108 and 110. Also, if the end system 104-2 that hosts applications 102-3 and 102-4 fails, applications 102-9, 102-11, and 102-16 will not receive data from application 102-4 and application 102-13 will not receive data from application 102-3.

To address the failure scenario described above in connection with FIG. 1C, systems are typically designed to include multiple redundant source applications 102 (hosted on multiple, different end systems 104) to provide data to the destination applications 102 via multiple redundant virtual links. The downside of this design approach, however, is that additional end systems are required in the system to host the redundant applications, more virtual links and network bandwidth are required, and destination applications must perform source selection processing, which consumes additional processing time.

SUMMARY

One embodiment is directed to a system comprising a plurality of end systems that communicate using a plurality of virtual links. Each of the virtual links has a respective virtual link identifier. The plurality of end systems are configured so that only one of the end systems is allowed to source frames that include each virtual link identifier at a time but, for at least one virtual link identifier, the one end system that is allowed to source frames that include that virtual link identifier is allowed to change. The system further comprises a switch to communicatively couple the plurality of nodes. The switch comprises a plurality of switch ports and a switch fabric communicatively coupled to the switch ports. Each of the end systems is communicatively coupled to the switch fabric via one of the switch ports. Each switch port is configured to accept any frame received on that switch port that includes one of a respective set of the virtual link identifiers associated with that switch port and to reject any frame received on that switch port that does not include one of the respective set of virtual link identifiers associated with that switch port. The switch fabric is configured to forward each valid frame to a set of destination switch ports associated with a link identifier included in that valid frame. The switch is configured to accept frames that include at least one virtual link identifier on more than one switch port.

In one implementation, each switch port is statically configured to accept frames that include any virtual link identifier that is allowed to be sourced by the one or more end systems coupled to that switch port during any operating mode supported by those end systems. In another implementation, each switch port is dynamically configured to accept frames that include only the virtual link identifiers that are currently allowed to be sourced by the one or more end systems coupled to that switch port.

DRAWINGS

DETAILED DESCRIPTION

Figure 1A:
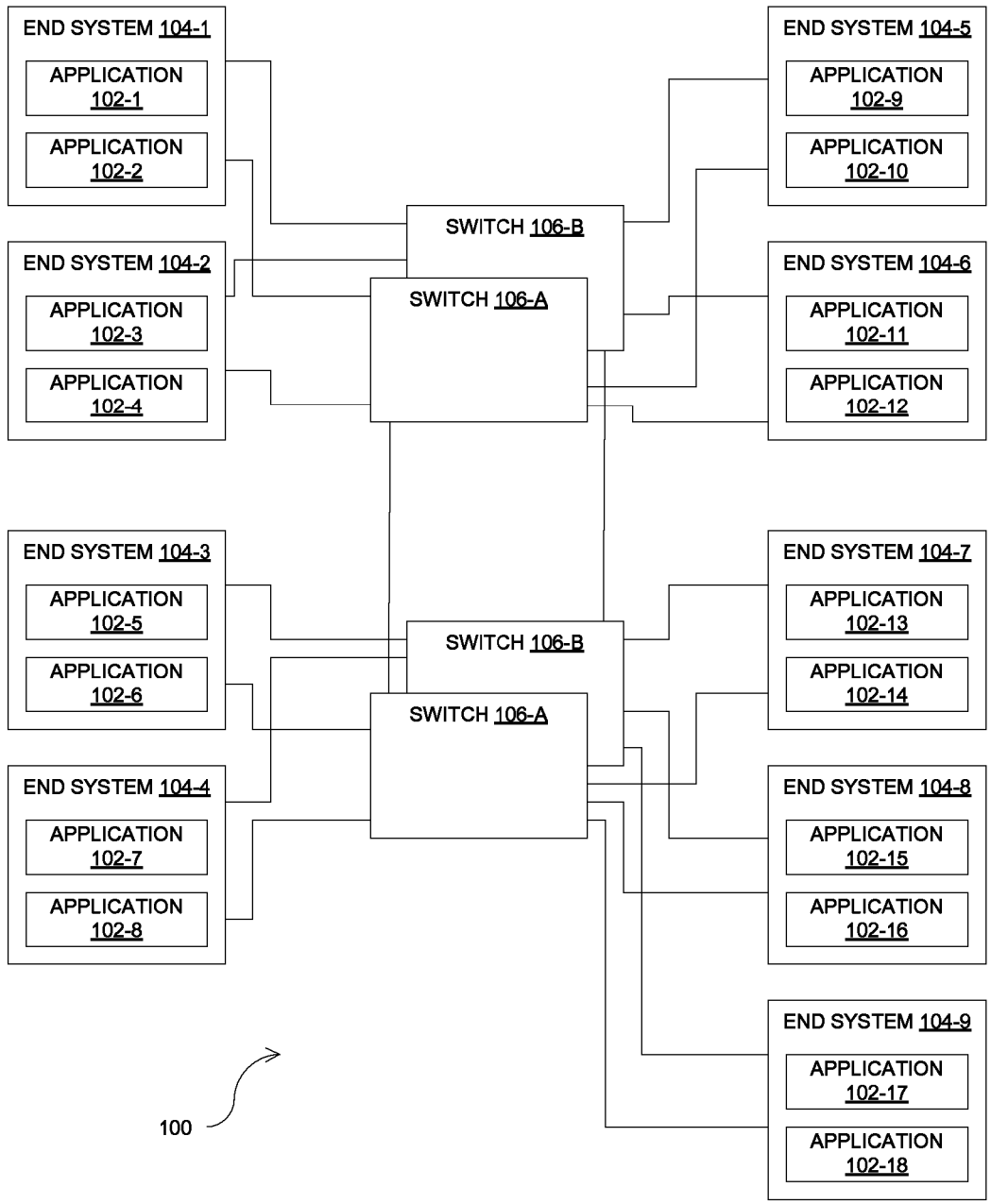
FIGS. 1A-1C are block diagrams illustrating a conventional topology for a safety-critical switched network that uses virtual links.
Figure 1B:
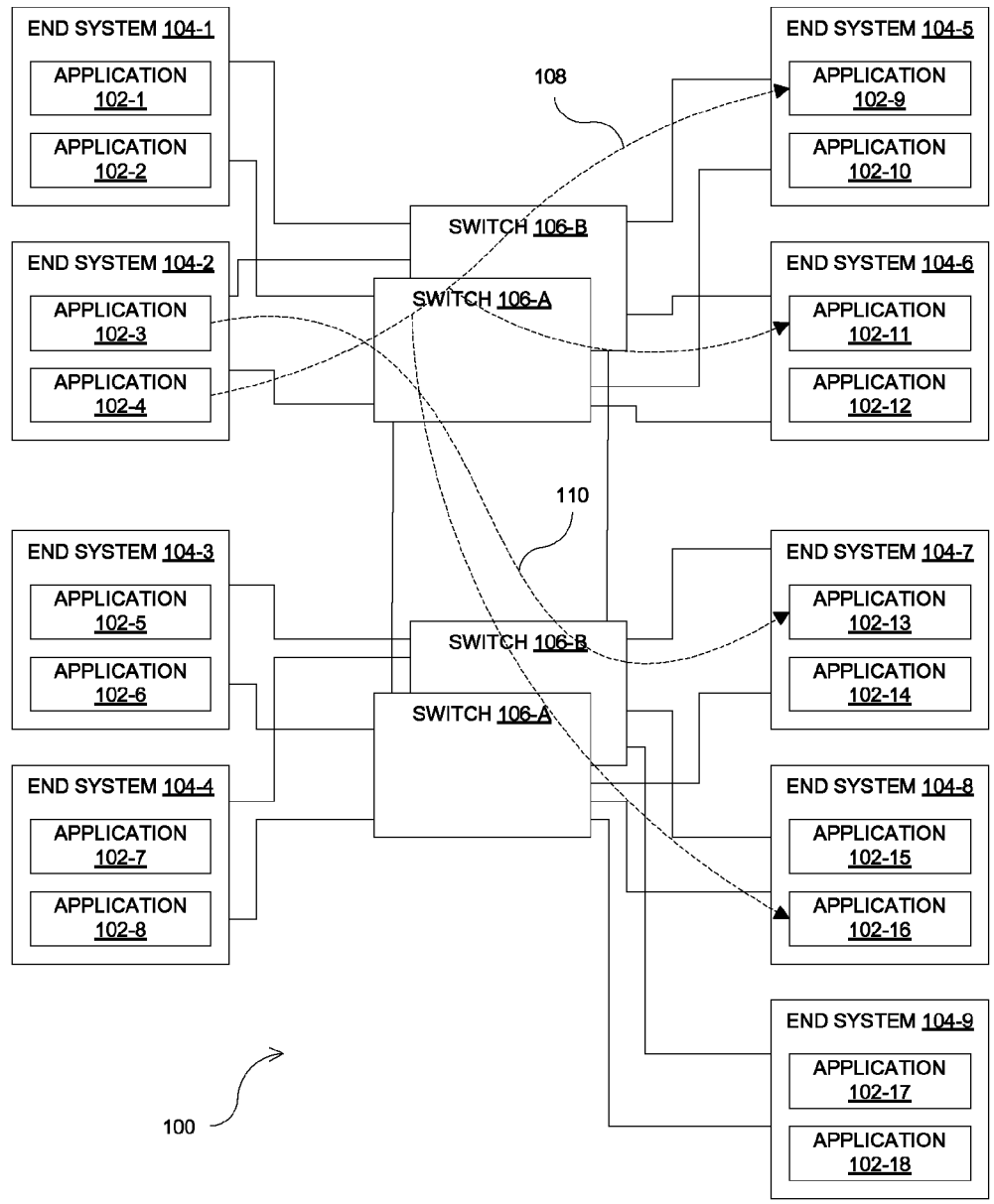
Figure 1C:
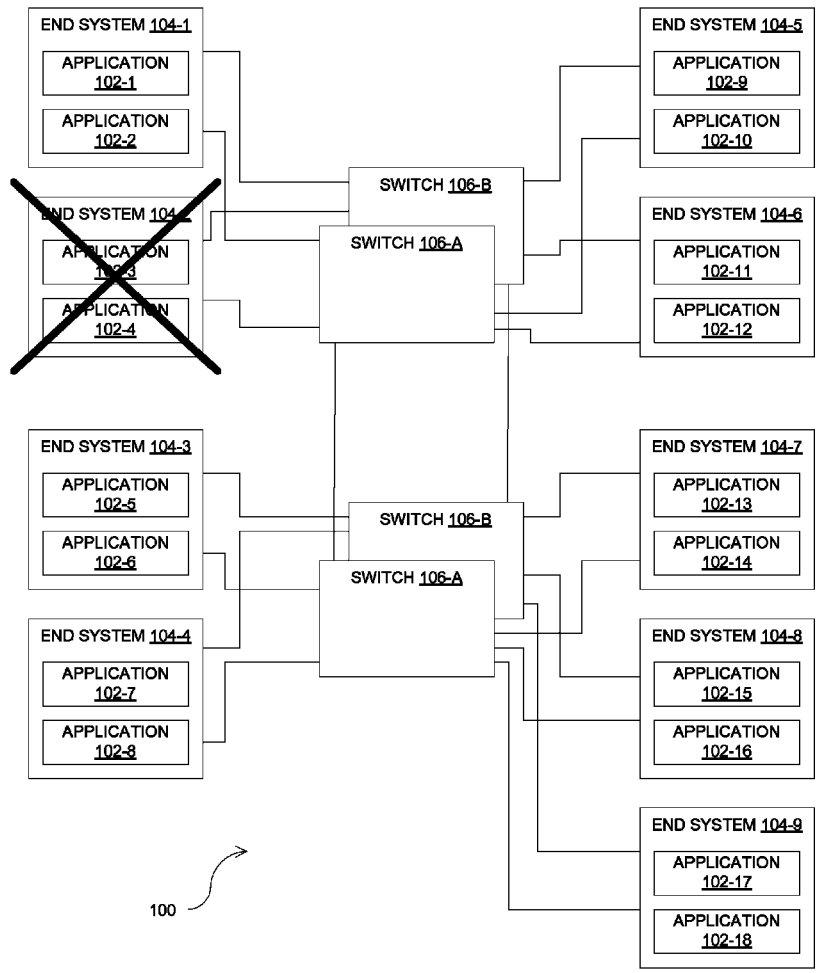
Figure 2A:
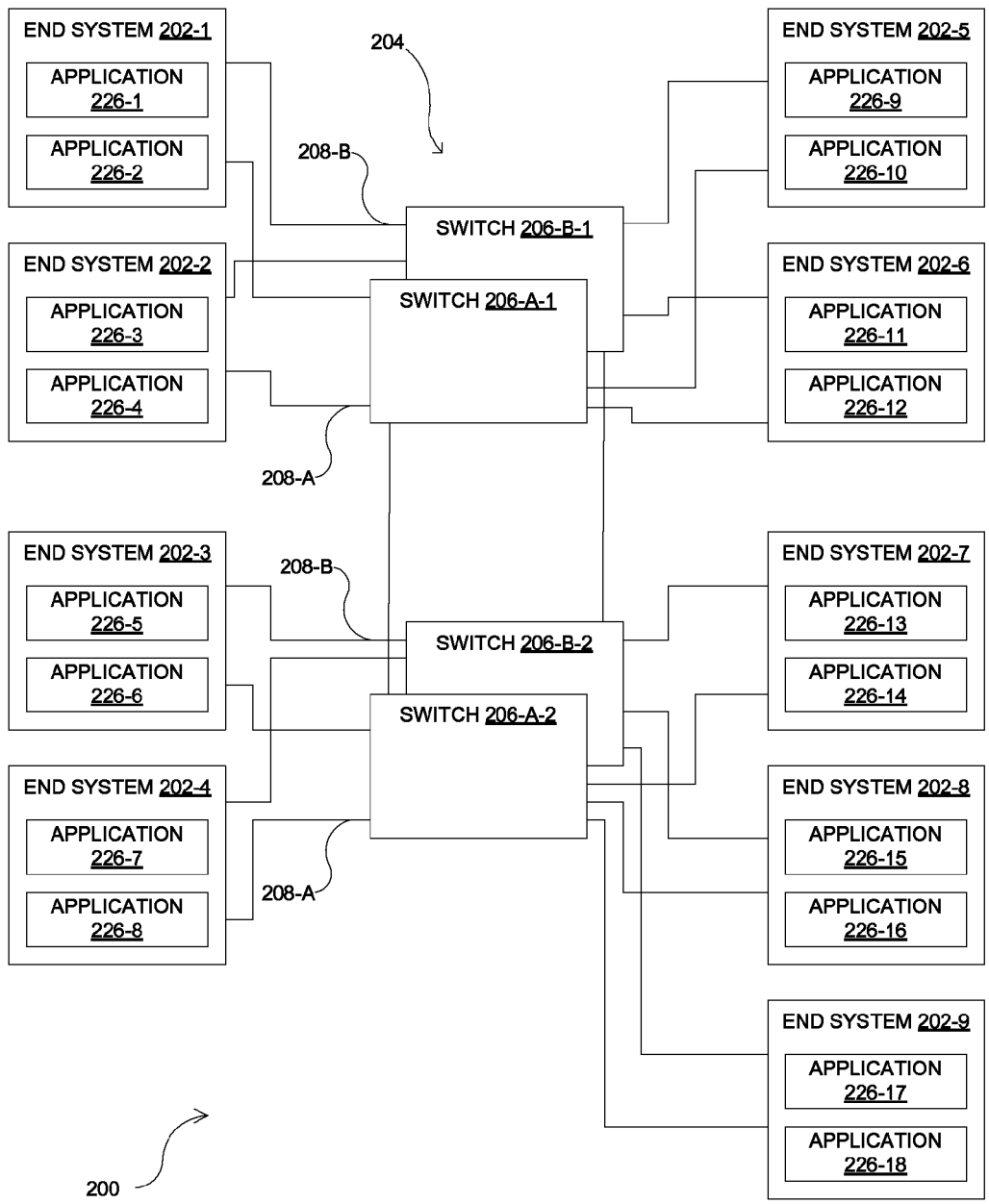
FIG. 2A is a block diagram of an exemplary embodiment of a system that includes a plurality of end systems that communicate with each other over a switched network.

FIG. 2A is a block diagram of an exemplary embodiment of a system 200 that includes a plurality of end systems 202 that communicate with each other over a switched network 204.

The switched network 204 is configured to implement one or more logical communication channels for communications among the end systems 202. In the exemplary embodiment shown in FIG. 2A, two redundant communication channels are used, which are individually referred to here as channels "A" and "B" (though it is to be understood that a different number of channels can be used). In the example shown in FIG. 2A, each communication channel is implemented using a separate set of switches 206 and full-duplex physical communication links 208, where the set of switches 206 and links 208 used to implement channel A are identified in FIG. 2A with the labels "206-A" and "208-A", respectively, and the set of switches 206 and links 208 used to implement channel B are identified in FIG. 2A with the labels "206-B" and "208-B", respectively. The switches 206-A used to implement channel A are also individually labeled in FIG. 2A using labels "206-A-1" and "206-A-2", and the switches 206-B used to implement channel B are also individually labeled in FIG. 2A using labels "206-B-1" and "206-B-2".

For each channel implemented in the network 204, each end system 202 is coupled to one of the switches 206 used to implement that channel using a respective link 208. For example, in the exemplary embodiment shown in FIG. 2A, each end system 202 is coupled to one of the switches 206-A used to implement channel A using a respective link 208-A and to one of the switches 206-B used to implement channel B using a respective link 208-B. In the exemplary embodiment shown in FIG. 2A, in order to provide connectivity among all the end systems 202 in the network 204, the switches 206-A that are used to implement channel A are also coupled to one another using respective links 208-A and the switches 206-B are coupled to one another using respective link 208-B. The particular exemplary embodiment shown in FIG. 2A is described here as being implemented using a switched ETHERNET network (for example, an AFDX, TT-E, or TT-GbE switched ETHERNET network) using suitable ETHERNET physical media (for example, using ETHERNET copper or optical cables) to implement each link 208, though other embodiments can be implemented in other ways.

Figure 2B:
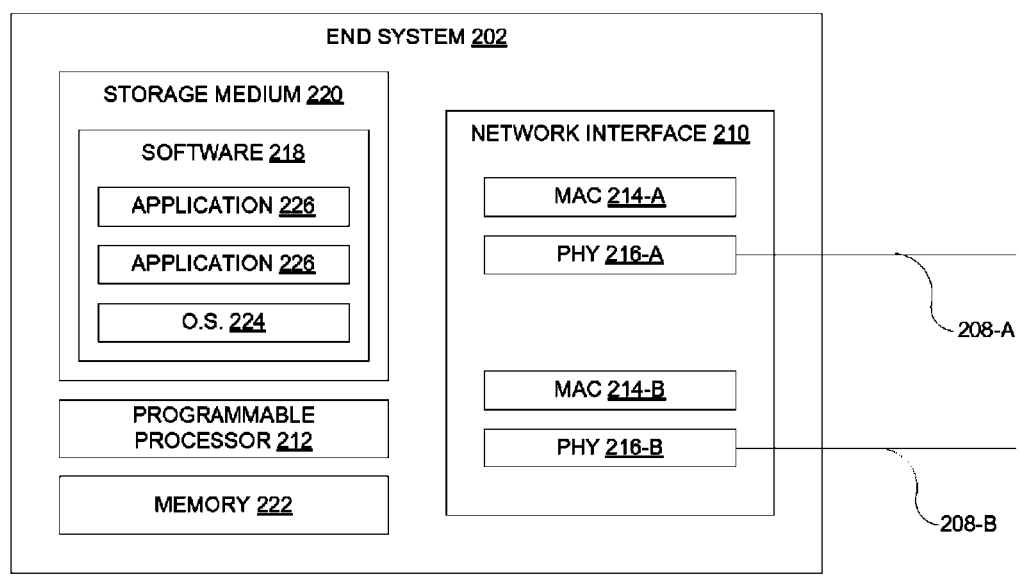
FIG. 2B is a block diagram of an exemplary embodiment of an end system used in the system of FIG. 2A.

FIG. 2B illustrates the details of each end system 202. As shown in FIG. 2B, each end system 202 also includes a network interface 210 to connect that end system 202 (and the processor 212 included therein described below) to one channel-A switch 206-A over a respective link 208-A and to one channel-B switch 206-B over a respective link 208-B. In the particular exemplary embodiment shown in FIG. 2B, each network interface 210 includes a media access control (MAC) device 214-A and physical layer device (PHY) 216-A (for example, suitable ETHERNET MAC and PHY devices) for connecting the end system 202 to the respective channel-A switch 206-A and a media access control (MAC) device 214-B and physical layer device (PHY) 216-B (for example, suitable ETHERNET MAC and PHY devices) for connecting the end system 202 to the respective channel-B switch 206-B. Also, the network interface 210 includes other functionality (for example, traffic policing, integrity checking, and redundancy management functionality) that implements various functions specified by one or more safety-critical switched network specifications (such as one or more AFDX, TT-E, and/or TT-GbE standards).

In the exemplary embodiment shown in FIG. 2B, each of the end systems 202 further comprises one or more programmable processors 212 for executing software 218. The software 218 comprises program instructions that are stored (or otherwise embodied) on or in an appropriate non-transitory storage medium or media 220 (such as flash or other non-volatile memory, magnetic disc drives, and/or optical disc drives) from which at least a portion of the program instructions are read by the programmable processor 212 for execution thereby. Although the storage media 220 is shown in FIG. 2B as being included in, and local to, the respective end system 202, it is to be understood that remote storage media (for example, storage media that is accessible over the network 204) and/or removable media can also be used. Each end system 202 also includes memory 222 for storing the program instructions (and any related data) during execution by the programmable processor 212. Memory 222 comprises, in one implementation, any suitable form of random access memory (RAM) now known or later developed, such as dynamic random access memory (DRAM). In other embodiments, other types of memory are used. The various components of each end system 202 are communicatively coupled to one another as needed using appropriate interfaces and interconnects, for example, buses, ports, and the like.

In the exemplary embodiment shown in FIG. 2B, the software 218 executing on each end system 202 comprises an operating system 224, which implements operating-system related functions such as scheduling and managing access to resources (such as processor, memory, and input-output resources). In one implementation of such an embodiment, the operating system 224 is implemented using a real-time operating system, for example, a real-time operating system that implements one or more of the family of specifications published by Aeronautical Radio Inc. (ARINC) under the title "ARINC Specification 653: Avionics Application Standard Software Interface" (also referred to as "ARINC 653").

The software 218 executing on each end system 202 also comprises one or more applications 226 that carry-out one or more application-layer functions for which the system 200 is used. As described in more detail below, the execution of the applications 226 is controlled and scheduled by the operating system 224.

In the exemplary embodiment shown in FIG. 2A, the system 200 includes nine end systems 202 (individually labeled in FIG. 2A as end system 202-1, end system 202-2, through 202-9) and eighteen applications 226 (individually labeled in FIG. 2A as application 226-1, application 226-2, through 226-18.), though other numbers of end systems and/or applications can be used in other embodiments. Moreover, for the sake of illustration, each end system 202 is shown as executing two application 226, though it is to be understood that the techniques described here are not limited to having each end system 202 execute two applications 226 or having all of the end systems 202 execute the same number of applications 226.

In the exemplary embodiment shown in FIG. 2A, the system 200 is configured so that one or more of the applications 226 can be executed by more than one of the end systems 202 (though each application 226 is executed by only one end system 202 at a time). That is, for each such application 226, one "primary" end system 202 is designated for that application 226 that executes the application 202 if it is able to do so. Also, for each such application 226, a "backup" end system 202 is designated that is configured to execute that application 226 if the primary end system 202 designated for that application 226 fails and is unable to execute the application 226. Regardless of which end system 202 is executing each application 226, the application 226 uses the same virtual links and virtual link identifiers for sending and receiving frames with other applications 226.

Applications 226 that have the same primary end system 202 need not all have the same designated backup end system 202. Also, each end system 202 can be configured to be a backup end system 202 for multiple applications 226 where each such application 226 has a different primary end system 202.

An end system 202 is referred to herein as a "backup" (or backup end system 202) for another end system 202 if that end system 202 is designated as the backup end system 202 for one or more applications 226 executing on that other end system 202.

Each end system 202 (and the operating system 224 executing thereon) is configured to operate in a "normal" mode and one or more "backup" modes. When each end system 202 is operating in normal mode, the end system 202 executes only those applications 226 for which that end system 202 is the primary end system 202. When each end system 202 is operating in a backup mode, the end system 202 executes one or more applications 226 for which that end system 202 is a backup end system 202.

Where an end system 202 serves as a backup end system 202 for multiple other end systems 202, the operating system 224 will be configured to operate in multiple backup modes to reflect the various possible combinations of operational states that can exist for such other end systems 202. That is, for a given end system 202, the set of zero, one, or more other end systems 202 for which that given end system 202 is designated as a backup is referred to here as the "set of associated end systems 202" for that given end system 202. At any given point in time, each of the set of associated end systems 202 has a respective operational state. In some implementations of such an embodiment, the relevant operational state for each end system 202 is whether the given end system 202 is operational or has failed. In other implementations, the relevant operational state for each end system 202 is the particular mode of operation in which that end system 202 is operating.

For each possible combination of operational states of the set of associated end systems 202 there is an associated mode of operation in which the given end system 202 should operate so that the appropriate applications 226 are executed on that end system 202.

Figure 3:
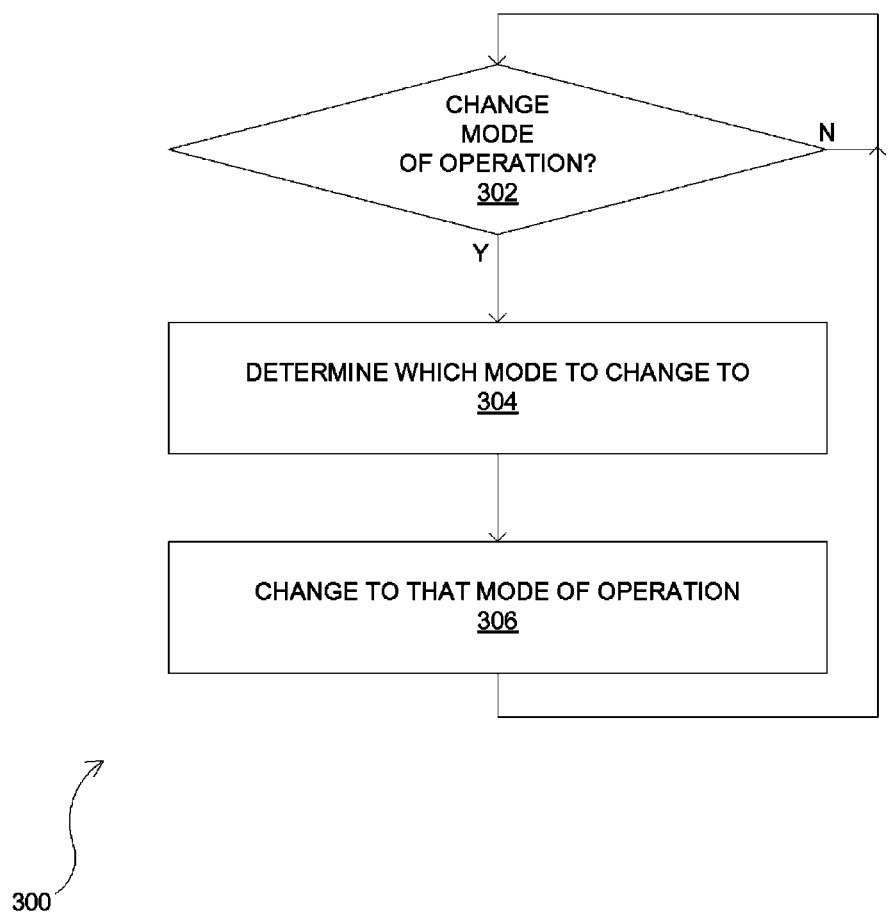
FIG. 3 is a flow diagram of one exemplary embodiment of a method of executing applications on an end system in the system of FIG. 2A.

FIG. 3 is a flow diagram of one exemplary embodiment of a method 300 of executing applications 226 on an end system 202 in the system 200 of FIG. 2A. The embodiment of method 300 shown in FIG. 3 is described here as being implemented by the operating system 224 (shown in FIG. 2B) executed on an end system 202 in the system 200 of FIG. 2A (though other embodiments can be implemented in other ways).

Method 300 comprises determining if the end system 202 should change its mode of operation (block 302). For example, the operating system 224 can be configured to determine if it should change its mode of operation by automatically determining when another end system 202 for which that end system 202 serves as a backup end system 202 has failed (or when such other end system 202 becomes operational after having previously failed). Any conventional mechanism for determining when other end systems 202 have failed (or have become operational after having failed) can be used (for example, heartbeat messages, status messages, etc.). The operating system 224 can also be configured to change its operating mode based on an external command that is communicated to that end system 202 (for example, over channel A and channel B and/or over a separate control channel).

If the operating system 224 executing on the end system 202 determines that the end system 202 should change its mode of operation, the operating system 224 determines which mode of operation it should change to (block 304) and then changes to that mode of operation (block 306).

Where the operating system 224 is changing the mode of operation of a given end system 202 based on detecting a failure of another end system 202 for which the given end system 202 serves as a backup (or based on detecting such other end system 202 becoming operational after having failed), the operating system 224 determines which mode of operation to change to by first determining the operational states of the set of end systems 202 associated with the given end system 202 and then changing to the mode of operation that is appropriate for the operational states of the set of associated end systems 202. Where the operating system 224 is changing the mode of operation of a given end system 202 in response to receiving an external command, the external command can identify the mode that the given end system 202 should change to or the external command can indicate that the operating system 224 change to the mode of operation that is appropriate for the operational states of the set of end systems 202 associated with the given end system 202.

As a part of changing to the new mode of operation, the operating system 224 may need to "adjust" the execution of other applications 226 that were previously executing on that end system 202. Such adjustments can include, for example, terminating or suspending the execution of one or more such other applications 226 and/or reducing the amount of execution time that is allocated to such other applications 226. Other techniques for accommodating higher priority applications 226 can also be used. The information that is maintained by operating system 224 for each mode of operation includes information about what adjustments need to be made for that mode.

Typically, each end system 202 is configured to start in a particular default mode (for example, normal mode). Then, the operating system 244 performs method 300 to change its mode of operation as needed (for example, based on the operational states of the set of associated end systems 202).

In some embodiments, multiple backup end systems 202 are specified for at least one application 226, where a first backup end system 202 is configured to execute the application 226 if the primary end system 202 fails, a second backup end system 202 is configured to execute the application 226 if the primary and first backup end systems 202 fail, and so on. In such embodiments, each end system 202 is configured with appropriate backup modes to support operating as a first backup, second backup, and so on.

Figure 2C:
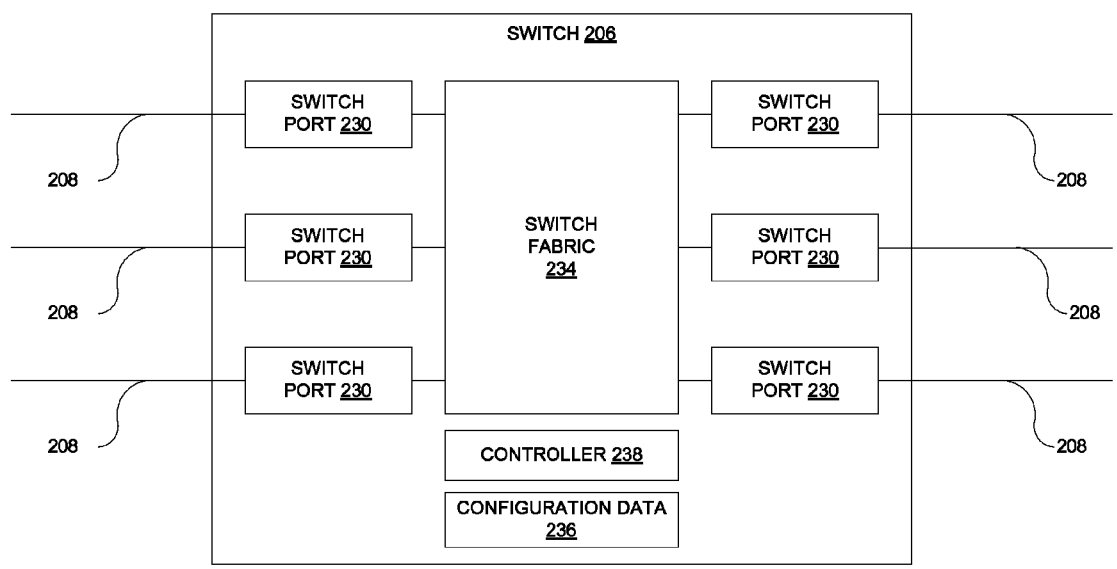
FIG. 2C is a block diagram of an exemplary embodiment of a switch used in the system of FIG. 2A.

FIG. 2C illustrates the details of the switches 206 used in the system 200 of FIG. 2A. In the exemplary embodiment shown in FIG. 2C, each switch 206 includes a plurality of switch ports 230. Each switch port 230 is configured to connect the corresponding switch 206 to either the network interface 210 of one end system 202 or to a switch port 230 of another switch 206 over a respective link 208. In the particular exemplary embodiment shown in FIG. 2C, each switch port 230 includes MAC and PHY functionality (not shown in FIG. 2C). For example, in the some implementations, each switch port 230 implements a standard ETHERNET PHY as well as other functions (for example, the checking of virtual link identifiers and traffic policing (such as checking frame size and/or timing)) specified by one or more safety-critical switched network specifications (such as one or more AFDX, TT-E, and/or TT-GbE standards). Each switch 206 also includes a switch fabric 234 that is configured to forward valid frames received on each switch port 230 to one or more other switch ports 230 based on the virtual link identifier included in each frame.

As used herein, an end system 202 is "associated with" a switch port 230 of a given switch 206 (and the switch port 230 is "associated with" that end system 202) if frames sent by or to that end system 202 are received or forwarded by the switch 206 on that switch port 230. For example, those end systems 202 that are directly connected to a switch port 230 of a switch 206 are associated with the switch port 230 to which they are directly connected. Each switch port 230 that is directly connected to another switch 206 (and not to any end system 202) is associated with all end systems 202 that are accessible via that switch port 230.

Each switch 206 includes configuration data 236 that is stored in, for example, memory and/or a storage medium (for example, flash memory) included within the switch 206. This configuration data 236 includes a respective set of "acceptable" virtual link identifiers for each switch port 230 that will be accepted by that switch port 230. As used herein, a switch port 230 "accepting a virtual link identifier" refers to a switch port 230 accepting a frame that includes that virtual link identifier. Also, the configuration data 236 includes a respective set of "destination" switch ports 230 for each virtual link identifier. The switch fabric 234 is configured to forward frames to the destination switch ports 230 associated with the virtual link identifier included in that frame. The switch 206 also includes a controller 238 (implemented using, for example, a programmable processor) that controls the operations of the switch 206.

When a frame is received on a particular switch port 230, the switch port 230 checks if the virtual link identifier included in the received frame is included in the set of virtual link identifiers associated with that switch port 230. If the virtual link identifier included in the received frame is not included in the set of virtual link identifiers associated with that switch port 230, the switch port 230 rejects the frame (that is, drops the frame and does not provide it to the switch fabric 234 for forwarding). If the virtual link identifier included in the received frame is included in the set of virtual link identifiers associated with that switch port 230, the switch port 230 accepts the frame and checks if the frame complies with one or more traffic policies (for example, policies relating to frame size and/or timing). If the accepted frame also complies with the relevant traffic policies, the switch port 230 forwards the frame to the switch fabric 234, which forwards the frame to the destination switch ports 230 associated with that virtual link identifier. In this exemplary embodiment, this virtual link identifier checking is performed at each switch port 230, though in other implementations and embodiments such checking is performed elsewhere (for example, by the switch fabric 234 or by another entity that is separate from the switch ports 230 and the switch fabric 234).

As noted above, the system 200 is configured so that the end system 202 that sources frames for each virtual link can change (for example, in responses to a failure of an end system 202 that was previously sourcing frames for that virtual link). Each switch 202 in the system 200 is configured so that it is able to accept frames sourced by the new end system 202 when there is such a change. In one implementation of such an embodiment, each switch port 230 is statically configured to accept all possible virtual link identifiers that are allowed to be sourced by the one or more end systems 202 associated with that switch port 230 in any of the modes of operation supported by those end systems 202. In such an implementation, the switch port 230 is referred to here as being "statically configured" in that the set of acceptable virtual link identifiers stored in the configuration data 236 for that switch port 230 does not change in response to changes in the operational states of the end systems 202 in the system 200.

In a second implementation, each switch port 230 is "dynamically" configured to accept only the virtual link identifiers that are currently allowed to be sourced by the one or more end systems 202 associated with that switch port 230. That is, in such a dynamically configured implementation, the set of acceptable virtual identifiers for each switch port 230 is updated to reflect any changes in the operational states of the end systems 202 in the system 200. One such dynamically configured implementation is described below in connection with FIG. 6.

Figure 4A:
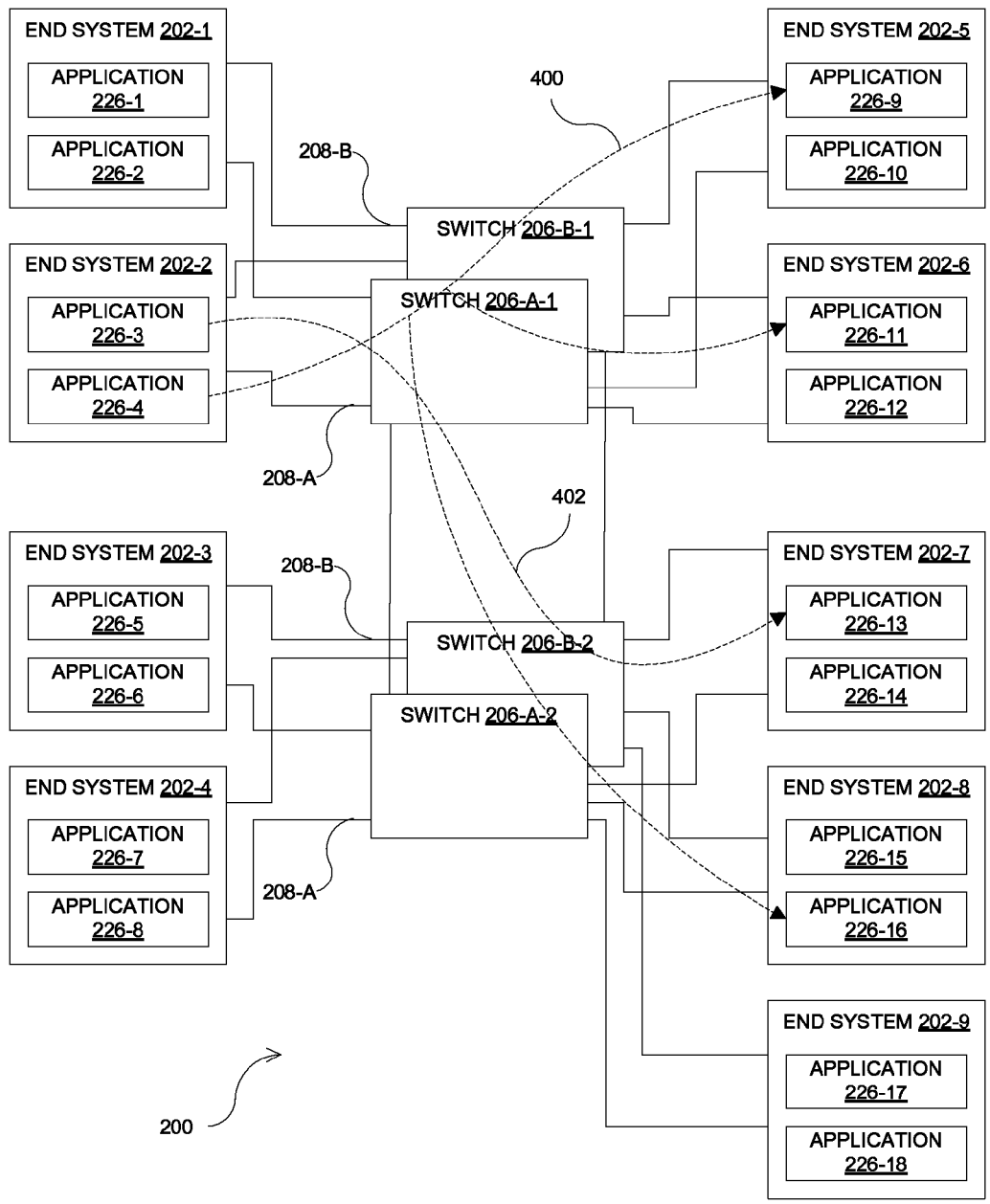
FIGS. 4A-4C are block diagrams illustrating one example of the operation of the system of FIG. 2A.
Figure 4B:
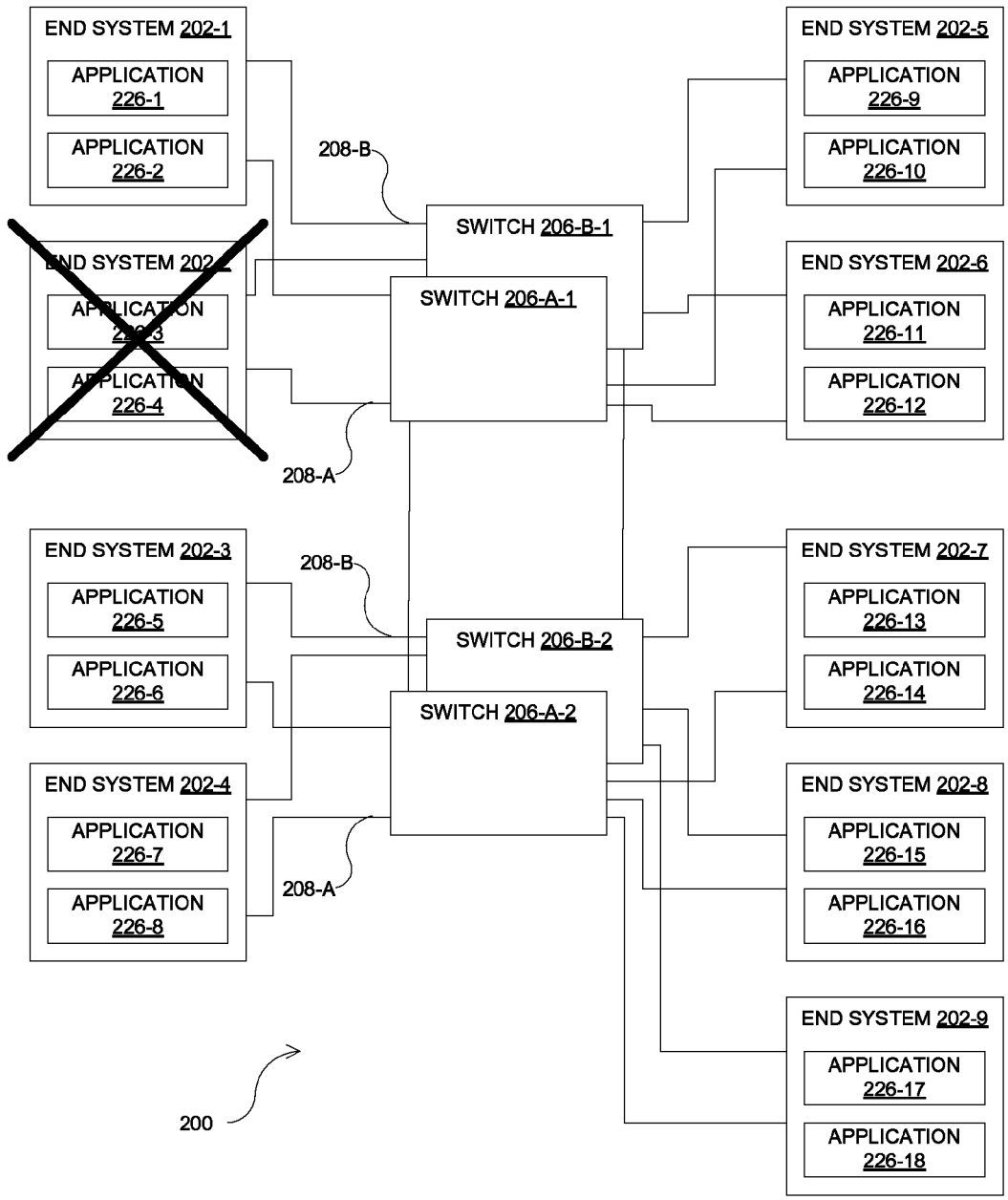
Figure 4C:
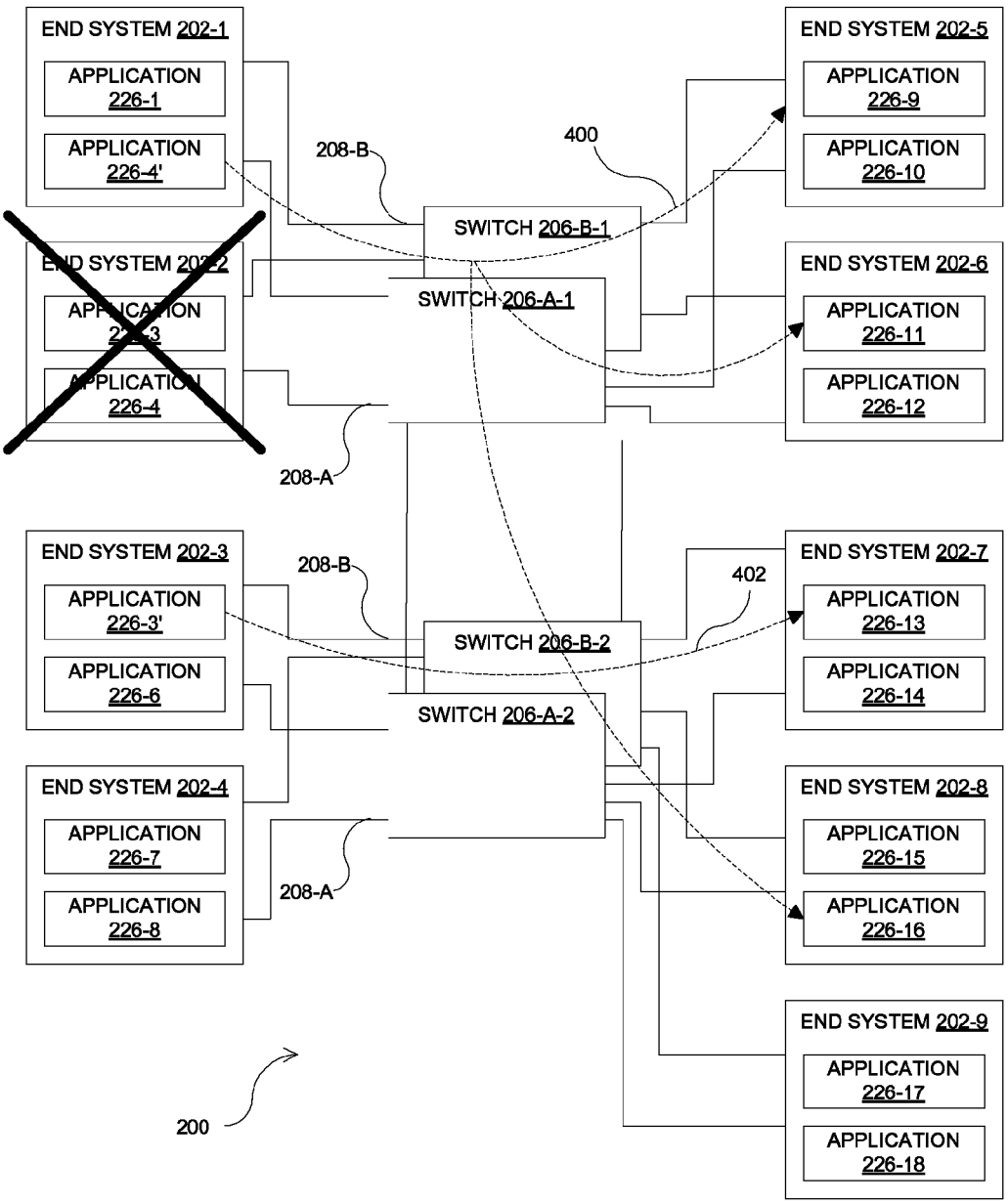

FIGS. 4A-4C illustrate one example of the operation of the system 200 of FIG. 2A. In this example, the system 200 is configured so that a first virtual link 400 has application 226-4 as its source application and applications 226-9, 226-11, and 226-16 as its destination applications. Also, in this example, the system 200 is configured so that a second virtual link 402 has application 226-3 as its source application and application 226-13 as its destination application. Also, in this example, end system 202-2 is the primary end system for applications 226-3 and 226-4. The backup end system for application 226-3 is end system 202-3, and the backup end system for application 226-4 is end system 202-1.

Figure 5:
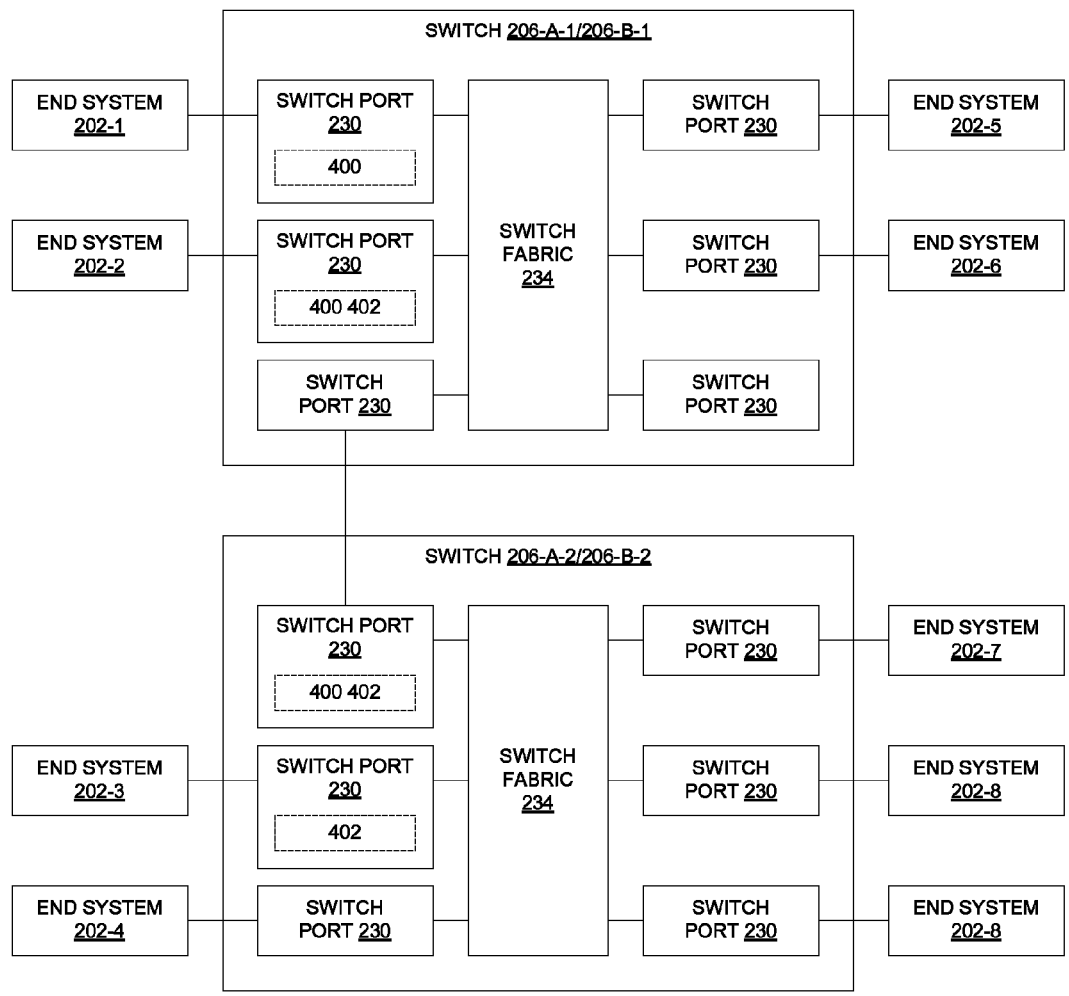
FIG. 5 is a block diagram illustrating one example of a static switch configuration for use in the system of FIG. 2A.

FIG. 5 is a block diagram illustrating one example of a static switch configuration for use in the example shown in FIGS. 4A-4C. As shown in FIG. 5, in switches 206-A-1 and 206-B-1, the set of acceptable virtual link identifiers for the switch port 230 associated with end system 202-2 includes the first and second virtual link identifiers 400 and 402 and the set of acceptable virtual link identifiers for the switch port 230 associated with end system 202-1 includes the first virtual link identifier 400. In switches 206-A-2 and 206-B-2, the set of acceptable virtual link identifiers for the switch port 230 associated with end system 202-3 includes the second virtual link identifier 402 and the set of acceptable virtual link identifiers for the switch port 230 associated with end systems 202-1, 202-2, 202-5, and 202-6 includes both the first and second virtual link identifiers 400 and 402.

FIG. 4A illustrates the first and second virtual links 400 and 402 when the primary end system 202-2 is operational. In this example, end system 202-2 is directly connected to two switches 206-A-1 and 206-B-1 (one for each of the channels A and B). When application 226-4 sends a frame on the first virtual link 500, the frame is received at switches 206-A-1 and 206-B-1 on the respective switch port 230 that is associated with the end system 202-2. Those switch ports 230 accept the frame (since they have been configured to accept frames for the first virtual link 500), and the switch fabric 234 in each of those switches 206-A-1 and 206-B-1 forwards the received frame to the switch port 230 associated with end system 202-5 (in order to forward the frame to application 226-9), to the switch port 230 associated with end system 202-6 (in order to forward the frame to application 226-11), and to the switch port 230 associated with end system 202-8 (in order to forward the frame to application 226-16).

In this example, end systems 202-5 and 202-6 are directly connected to switches 206-A-1 and 206-B-1; as a result, the switch fabric 234 in those switches 206-A-1 and 206-B-1 forwards the received frames to the switch ports 230 that are directly connected to end systems 202-5 and 202-6. In this example, end system 202-8 is not directly connected to switches 206-A-1 and 206-B-1 and instead is directly connected to switches 206-A-2 and 206-B-2. As a result, the switch fabric 234 in each of the switches 206-A-1 and 206-B-1 forwards the received frames to the switch port 230 that is directly connected to switch 206-A-2 and 206-B-2, respectively. Those switch ports 230 accept the received frame (since they have been configured to accept frames for the first virtual link 400), and the switch fabric 234 in each of those switches 206-A-2 and 206-B-2 forwards the received frame to the switch port 230 that is directly connected to end system 202-8 (in order to forward the frame to application 226-16).

Similar processing is performed for the second virtual link 402. When application 226-3 sends a frame on the second virtual link 502, the frame is received at switches 206-A-1 and 206-B-1 on the respective switch port 230 associated with the end system 202-2. Those switch ports 230 accept the frame (since they have been configured to accept frames for the second virtual link 402), and the switch fabric 234 in each of those switches 206-A-1 and 206-B-1 forwards the received frame to the switch port 230 associated with end system 202-7 (in order to forward the frame to application 226-13). In this example, end system 202-7 is not directly connected to switches 206-A-1 and 206-B-1 and instead is directly connected to switches 206-A-2 and 206-B-2. As a result, the switch fabric 234 in each of the switches 206-A-1 and 206-B-1 forwards the received frame to the switch port 230 that is directly connected to switch 206-A-2 and 206-B-2, respectively. Those switch ports 230 accept the received frame (since they have been configured to accept frames for the second virtual link 402), and the switch fabric 234 in each of those switches 206-A-2 and 206-B-2 forwards the received frame to the switch port 230 that is directly connected to end system 202-7 (in order to forward the frame to application 226-13).

In this example, end system 202-2 fails at some point (as shown in FIG. 4B) and is no longer to properly execute applications 226-3 and 226-4.

As shown in FIG. 4C, the end systems 202-1 and 202-3, which are both backups for end system 202-2, will detect that end system 202-2 has failed and, as a result, will change their mode of operation. End system 202-1 will change its mode of operation to one in which it executes application 226-4. One of the adjustments that end system 202-1 makes in changing to this mode of operation is to not execute application 226-2 (for example, because it is a low priority application). End system 202-3 will change its mode of operation to one in which it executes application 226-3. One of the adjustments that end system 202-3 makes in changing to this mode of operation is to not execute application 226-5 (for example, because it is a low priority application).

When end system 202-2 fails and applications 226-3 and application 226-4 move to end systems 202-3 and 202-1, respectively, the switches 206 will accept frames received on the switch ports 230 associated with end systems 202-1 and 202-3 for the first and second virtual links 400 and 402, respectively, since those switch ports 230 have been statically configured to accept such frames.

Since each switch port 230 is statically configured to accept all possible virtual link identifiers that are allowed to be sourced by the one or more end systems 202 associated with that switch port 230 in any of the modes of operation supported by those one or more end systems 202, it is possible for a switch port 230 to accept a virtual link identifier that is not currently allowed to be sourced by an end system 202 associated with that switch port 230. For example, in the example shown in FIGS. 4A-4C, when the primary end system 202-2 is operational as shown in FIG. 5A, the switch port 230 associated with end system 202-1 will accept frames for the first virtual ink 400 even though the end system 202-2 is currently operational and is the one end system that is allowed to source frames for the first virtual link 400. As a result, one of ordinary skill in the art will recognize that the end systems 202 should be configured to ensure that the same virtual link ID is not sourced from the primary and backup end system(s) at the same time.

In a dynamic switch configuration, when the end system 202 that executes a particular application 226 changes, the controller 238 in each switch 206 updates the source and destination switch port associations for any virtual links for which that application 226 is a source or a destination. The controller 238 updates such associations to reflect the new end system 202 that is executing the application 226. The end system 202 that executes a particular application 226 changes when at least one end system 202 changes its mode of operation (for example, from normal mode to backup mode). For example, when one end system 202 fails, one or more backup end systems 202 for that end system 202 change their mode of operation in order to execute one or more applications 226 that were previously executing on the failed end system 202.

Figure 6:
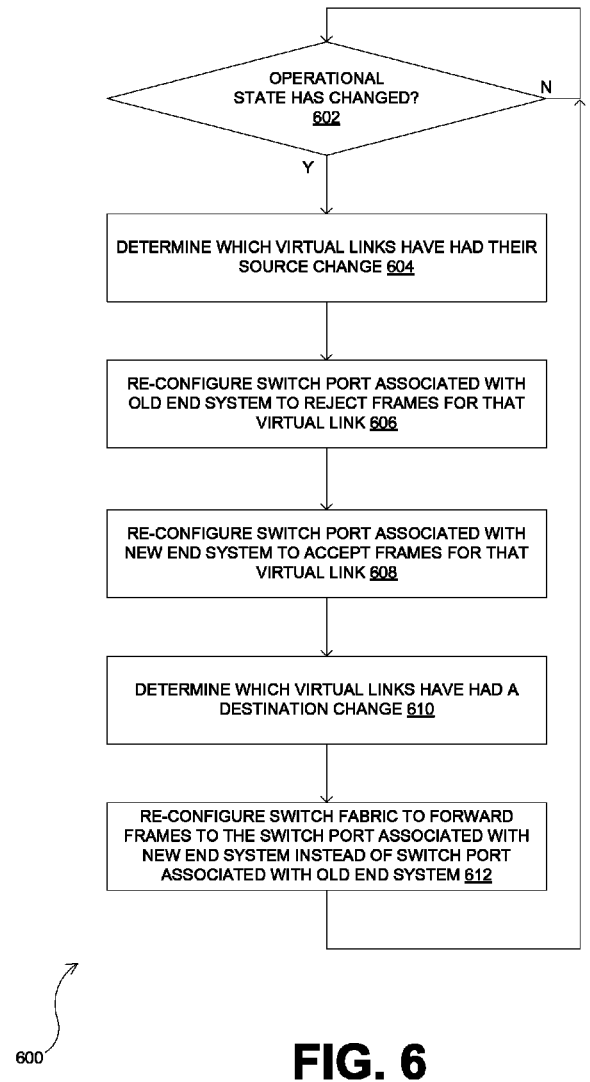
FIG. 6 is a flow diagram of one exemplary embodiment of a method of controlling a switch in the system of FIG. 2A.

FIG. 6 is a flow diagram of one exemplary embodiment of a method 600 of controlling a switch 206 in the system 200 of FIG. 2A. The particular embodiment of method 600 shown in FIG. 6 is described here as being implemented by the controller 238 (shown in FIG. 2C) in each switch 206 shown in FIG. 2A (though other embodiments can be implemented in other ways).

Method 600 comprises determining when a change in the operational state of at least one end system has occurred (block 602). In one implementation of such an embodiment, the controller 238 in each switch 206 is configured to monitor the operational states of each end system 202 in the system 200 (for example, using any of the mechanisms noted above).

When the controller 238 in a switch 206 determines that the operational state of at least one end system 202 has changed, the controller 238 determines which, if any, of the virtual links have had their source change from a respective old end system to a respective new end system in response to the change in operational state (block 604). For example, when an (old) end system 202 that was operating in normal mode fails, each application 226 that was executing on that end system 202 prior to that end system 202 failing is executed by the respective backup (new) end system 202 for that application 226. Any virtual links that are sourced by that application 226 will have had their source change from the failed (old) end system 202 to a respective backup (new) end system 202.

For each virtual link that has had its source change from a respective old end system 202 to a respective new end system 202, the controller 238 in each switch 206 re-configures the switch port 230 that is associated with the respective old end system 202 to reject any frames received on that switch port 230 that include the virtual link identifier for that virtual link (block 606) and re-configures the switch port 230 that is associated with the respective new end system 202 to accept any frames received on that switch port 230 that include the virtual link identifier for that virtual link (block 608). For example, in the switch embodiment shown in FIG. 2C, the controller 238 in each switch 206 removes that virtual link identifier from the set of acceptable virtual link identifiers for the switch port 230 that is associated with the respective old end system 202 and adds that virtual link identifier to the set of acceptable virtual link identifiers for the switch port 230 that is associated with the respective new end system 202.

Also, the controller 238 in each switch 206 determines which, if any, of the virtual links have had a destination for frames from that virtual link change from a respective old end system 202 to a respective new end system 202 in response to the change in operational state (block 610). For each the virtual link that has had a destination for that virtual link change from a respective old end system 202 to a respective new end system 202, the controller 238 in each switch 206 re-configures the switch fabric 234 in that switch 206 to forward frames that include the virtual identifier for that virtual link to the switch port 230 that is associated with the new end system 202 instead of the switch port 230 associated with the old end system 202 (block 612).

Figure 7A:
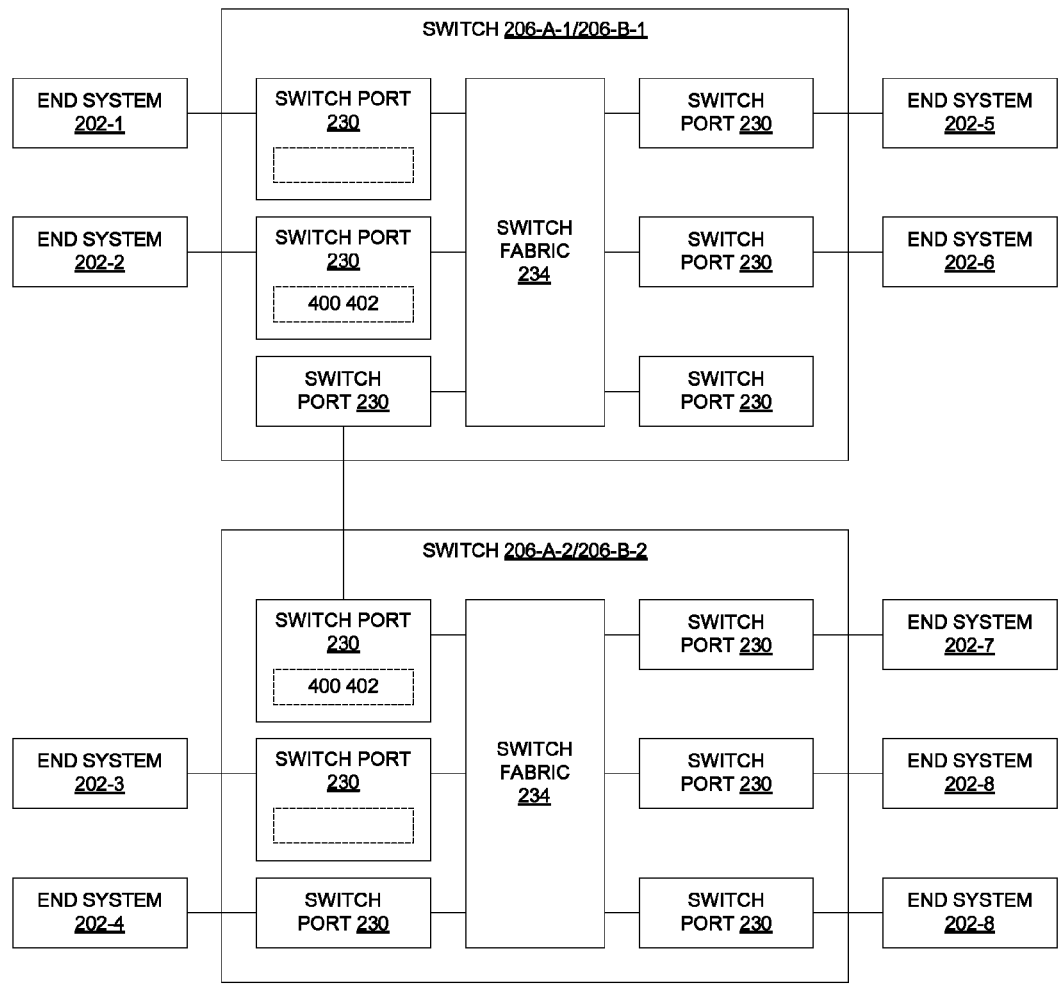
FIGS. 7A-7B are block diagrams illustrating one example of the operation of a dynamic switch configuration in the example shown FIGS. 5A-5C.
Figure 7B:
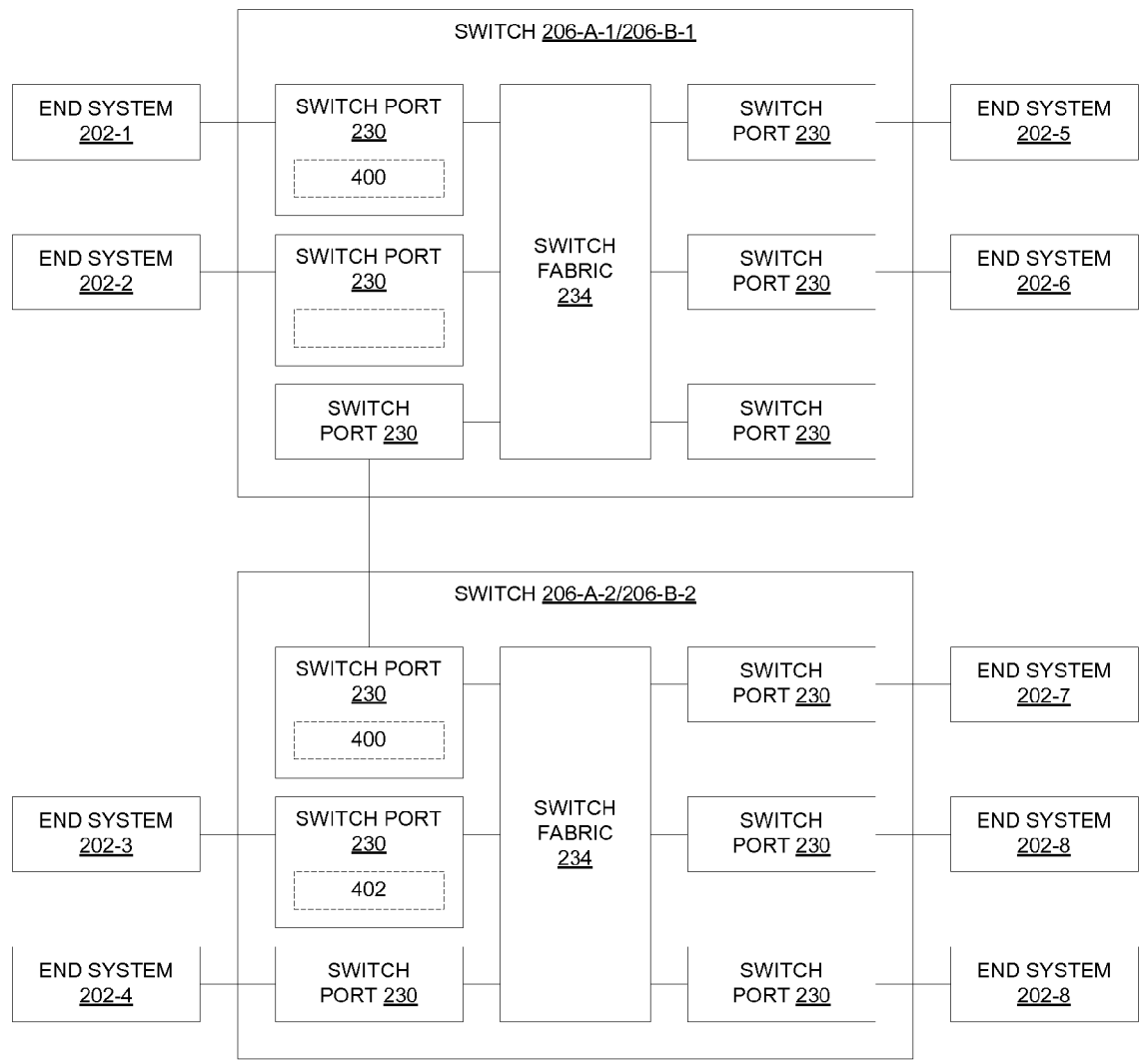

FIGS. 7A-7B are block diagrams illustrating the operation of such a dynamic switch configuration in the example described above in connection with FIGS. 4A-4C.

FIG. 7A illustrates the switches 206 when the end system 202-2 is operational as shown in FIG. 4A. When end system 202-2 is operational, end system 202-2 is the source for the first and second virtual links 400 and 402. As a result, for switches 206-A-1 and 206-B-1, the set of acceptable virtual link identifiers for the switch port 230 associated with end system 202-2 includes the first and second virtual links 400 and 402. Also, for switches 206-A-2 and 206-B-2, the set of acceptable virtual link identifiers for the switch port 230 associated with end systems 202-1, 202-2, 202-5, and 202-6 includes the first and second virtual links 400 and 402.

FIG. 7B illustrates the switches 206 when the end system 202-2 is not operational as shown in FIGS. 5B-5C. The controller 238 in each of the switches 206 will detect the failure of end system 202-2 and will determine that virtual links 400 and 402 have been impacted by the failure of end system 202-2. As a result, the controller 238 in each of the switches 206-A-1 and 206-B-1 will remove the first and second virtual links 400 and 402 from the set of acceptable virtual link identifiers for the switch port 230 associated with the end system 202-2 and will add the first virtual link 400 to the set of acceptable virtual link identifiers for the switch port 230 associated with the end system 202-1. Also, the controller 238 in each of the switches 206-A-2 and 206-B-2 will remove the second virtual link 402 from the set of acceptable virtual link identifiers for the switch port 230 associated with the end systems 202-1, 202-2, 202-5, and 202-6 and will add the second virtual link 402 to the set of acceptable virtual link identifiers for the switch port 230 associated with the end system 202-3.

In this example, the switches 206 in the dynamic switch configuration operate as described above in connection with FIGS. 4A-4C except that each switch port 230 only accepts those virtual link identifiers that are currently allowed to be sourced by an end system 202 associated with that switch port 230.

The techniques described here enable the end systems 202 to provide backup execution of applications 226 in the event of end system failures. This enables the overall system 200 to be constructed with a lesser total number of end systems 202 in order to maintain a particular level of required operating applications under failure conditions, which results in a lighter, lower cost and lower power system 200. Also, with the techniques described here, the system 200 can be constructed with fewer virtual links (and less bandwidth for the virtual links) in order to maintain a particular level of fault redundancy since additional virtual links are not needed for redundant end systems. The use of fewer virtual links (and less associated bandwidth) is advantageous in enabling the network to have more total capacity. Moreover, with the techniques described here, each application would not be required to consume redundant virtual links and perform voting routines on them. This reduces the software complexity of the applications and enables a more efficient use of processing throughput.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A switch to communicatively couple a plurality of end systems that communicate using a plurality of virtual links, each of the virtual links having a respective virtual link identifier, the switch comprising:
a plurality of switch ports; and
a switch fabric communicatively coupled to the switch ports, wherein each of the end systems is communicatively coupled to the switch fabric via one of the switch ports;
wherein each switch port is configured to accept any frame received on that switch port that includes one of a respective set of the virtual link identifiers associated with that switch port and to reject any frame received on that switch port that does not include one of the respective set of virtual link identifiers associated with that switch port;

wherein the switch fabric is configured to forward each valid frame to a set of destination switch ports associated with a virtual link identifier included in that valid frame;

wherein the plurality of end systems are configured so that, for each virtual link identifier, only one of the end systems at a time is allowed to source frames that include that virtual link identifier but, for at least one virtual link identifier, the one end system that is allowed to source frames that include that virtual link identifier is allowed to change from a first end system of the plurality of end systems to a second end system of the plurality of end systems;

wherein the respective set of virtual link identifiers associated with each switch port dynamically changes in response to changes in the operating modes of the end systems so that the respective set of virtual link identifiers associated with each switch port only includes the virtual link identifiers that are currently allowed to be sourced by the one or more end systems coupled to the switch via that switch port;

wherein each of the plurality of end systems has an associated operational state; and wherein the switch is configured to:

determine when a change in the operational state of at least one end system has occurred;

when the switch determines a change in the operational state of at least one end system has occurred determine which, if any, of the virtual links, in response to the change, have had the source of frames for that virtual link change from a respective old end system to a respective new end system; and for any of the virtual links that have had the source of frames for that virtual link change from the respective old end system to the respective new end system in response to the change:

re-configure the switch port that is associated with the respective old end system to reject any frames received on that switch port that include the virtual link identifier for that virtual link; and re-configure the switch port that is associated with the respective new end system to accept any frames received on that switch port that include the virtual link identifier for that virtual link;

determine which, if any, of the virtual links, in response to the change, have had a destination for frames from that virtual link change from a respective old end system to a respective new end system; and for any of the virtual links that have had a destination for frames from that virtual link change from the respective old end system to the respective new end system, re-configures the switch fabric to forward frames that include the virtual identifier for that virtual link to the switch port that is associated with the new end system instead of the switch port associated with the old end system.

2. The switch of claim 1, wherein the respective set of virtual link identifiers associated with each switch port is statically configured to include all the virtual link identifiers that are allowed to be sourced by any of the one or more end systems coupled to the switch via that switch port during any operating mode supported by said one or more end systems coupled to the switch by that switch port.

3. The switch of claim 1, wherein each switch port is configured to check that frames accepted by that switch port comply with one or more traffic policies, wherein each frame that is accepted and complies with the one or more traffic policies is considered valid and forwarded by the switch fabric to the respective set of destination switch ports associated with the respective link identifier included in that valid frame.

4. The switch of claim 1 further comprising a controller that is operable to control the switch ports and the switch fabric.

5. The switch of claim 1, wherein the switch comprises at least one of an Avionics Full-Duplex Ethernet (AFDX) switch, a Time-Trigger ETHERNET (TT-E) switch, and a Time-Triggered-Gigabit ETHERNET (TT-GBE) switch.

6. The switch of claim 1, wherein the switch is included in a system that comprises a plurality of switches that are used to implement a plurality of communication channels.

7. The switch of claim 6, wherein each switch port is directly connected to a respective one of the end systems or a switch port of another switch.

8. A system comprising:

a plurality of end systems that communicate using a plurality of virtual links, each of the virtual links having a respective virtual link identifier, wherein the plurality of end systems are configured so that, for each virtual link identifier, only one of the end systems is allowed to source frames that include that virtual link identifier at a time but, for at least one virtual link identifier, the one end system that is allowed to source frames that include that virtual link identifier is allowed to change from a first end system of the plurality of end systems to a second end system of the plurality of end systems;

a switch to communicatively couple the plurality of nodes, the switch comprising:

a plurality of switch ports; and a switch fabric communicatively coupled to the switch ports, wherein each of the end systems is communicatively coupled to the switch fabric via one of the switch ports;

wherein each switch port is configured to accept any frame received on that switch port that includes one of a respective set of the virtual link identifiers associated with that switch port and to reject any frame received on that switch port that does not include one of the respective set of virtual link identifiers associated with that switch port;

wherein the switch fabric is configured to forward each valid frame to a set of destination switch ports associated with a link identifier included in that valid frame;

wherein the respective set of virtual link identifiers associated with each switch port dynamically changes in response to changes in the operating modes of the end systems so that the respective set of virtual link identifiers associated with each switch port only includes the virtual link identifiers that are currently allowed to be sourced by the one or more end systems coupled to the switch via that switch port;

wherein each of the plurality of end systems has an associated operational state; and wherein the switch is configured to:

determine when a change in the operational state of at least one end system has occurred;

when the switch determines a change in the operational state of at least one end system has occurred determine which, if any, of the virtual links, in response to the change, have had the source of frames for that virtual link change from a respective old end system to a respective new end system; and for any of the virtual links that have had the source of frames for that virtual link change from the respective old end system to the respective new end system in response to the change:

re-configure the switch port that is associated with the respective old end system to reject any frames received on that switch port that include the virtual link identifier for that virtual link; and re-configure the switch port that is associated with the respective new end system to accept any frames received on that switch port that include the virtual link identifier for that virtual link;

determine which, if any, of the virtual links, in response to the change, have had a destination for frames from that virtual link change from a respective old end system to a respective new end system; and for any of the virtual links that have had a destination for frames from that virtual link change from the respective old end system to the respective new end system, re-configures the switch fabric to forward frames that include the virtual identifier for that virtual link to the switch port that is associated with the new end system instead of the switch port associated with the old end system.

9. The system of claim 8, wherein the respective set of virtual link identifiers associated with each switch port is statically configured to include all the virtual link identifiers that are allowed to be sourced by any of the one or more end systems coupled to the switch via that switch port during any operating mode supported by said one or more end systems coupled to the switch by that switch port.

10. The system of claim 8, wherein the system comprises a plurality of switches that are used to implement a plurality of communication channels.

11. The system of claim 10, wherein each switch port is directly connected to a respective one of the end systems or a switch port of another switch.

12. The system of claim 8, wherein the switch comprises at least one of an Avionics Full-Duplex Ethernet (AFDX) switch, a Time-Trigger ETHERNET (TT-E) switch, and a Time-Triggered-Gigabit ETHERNET (TT-GBE) switch.

13. A system comprising:

a plurality of end systems that communicate using a plurality of virtual links, each of the virtual links having a respective virtual link identifier, wherein the plurality of end systems are configured so that, for each virtual link identifier, only one of the end systems is allowed to source frames that include that virtual link identifier at a time but, for at least one virtual link identifier, the one end system that is allowed to source frames that include that virtual link identifier is allowed to change from a first end system of the plurality of end systems to a second end system of the plurality of end systems;

a switch to communicatively couple the plurality of nodes, the switch comprising:

a plurality of switch ports; and a switch fabric communicatively coupled to the switch ports, wherein each of the end systems is communicatively coupled to the switch fabric via one of the switch ports;

wherein each switch port is configured to accept any frame received on that switch port that includes one of a respective set of the virtual link identifiers associated with that switch port and to reject any frame received on that switch port that does not include one of the respective set of virtual link identifiers associated with that switch port;

wherein the switch fabric is configured to forward each valid frame to a set of destination switch ports associated with a link identifier included in that valid frame;

wherein the system is configured to execute a plurality of applications, wherein each application is associated with a respective one of the plurality of virtual link identifiers;

wherein each application has designated therefor one of the end systems that serves as a respective primary end system for that application that executes that application when that respective primary end system is able to do so, wherein the primary end system is allowed to source frames that include the virtual link identifier associated with that application when the primary end system is able to properly execute that application;

wherein the system is configured so that, for each of at least a subset of the applications, that application has designated therefor one of the end systems that serves as a respective backup end system for that application that executes that application when the respective primary end system is unable to do so, wherein the system is configured so that when the primary node is unable to execute that application, the respective backup end system is allowed to source frames that include the virtual link identifier associated with that application.

* * * * *